(12) United States Patent
Grubka et al.

(10) Patent No.: US 9,482,007 B2
(45) Date of Patent: Nov. 1, 2016

(54) FLEXIBLE LAMINATED HIP AND RIDGE SHINGLE

(71) Applicant: Owens Corning Intellectual Capital, LLC, Toledo, OH (US)

(72) Inventors: Lawrence J. Grubka, Westerville, OH (US); Jennifer L. Frey, Monclova, OH (US); James E. Loftus, Newark, OH (US); Donn R. Vermilion, Newark, OH (US); Jason D. Guerra, Tinley Park, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/751,334

(22) Filed: Jun. 26, 2015

(65) Prior Publication Data

US 2016/0024792 A1    Jan. 28, 2016

Related U.S. Application Data

(63) Continuation of application No. 12/727,459, filed on Mar. 19, 2010, now abandoned.

(60) Provisional application No. 61/161,996, filed on Mar. 20, 2009, provisional application No. 61/162,111, filed on Mar. 20, 2009.

(51) Int. Cl.
*E04D 1/30* (2006.01)
*B32B 1/00* (2006.01)
(Continued)

(52) U.S. Cl.
CPC . *E04D 1/30* (2013.01); *B32B 1/00* (2013.01); *B32B 3/26* (2013.01); *B32B 7/12* (2013.01);
(Continued)

(58) Field of Classification Search
CPC ......... E04D 1/30; E04D 1/3402; E04D 1/22; E04D 1/26; E04D 1/20; E04D 2001/347; B32B 3/26; B32B 1/00; B32B 7/12; B32B 2307/546; B32B 2255/24; B32B 2419/06; B32B 2255/26; B32B 2001/3435; C08L 95/00; C08L 53/00; C08L 55/00; Y10T 428/24355; Y10T 428/34364; Y10T 428/24372; Y10T 428/2438; Y10T 428/24388; Y10T 428/34397; Y10T 428/24405; Y10T 428/24413; Y10T 428/24421; Y10T 428/2443; Y10T 428/24025
USPC ......................................... 428/101, 141–150
See application file for complete search history.

(56) References Cited

U.S. PATENT DOCUMENTS

| 81,579 A | 9/1868 | Bailey |
| 154,334 A | 8/1874 | Marshall |

(Continued)

FOREIGN PATENT DOCUMENTS

| WO | 2005/100479 | 10/2005 |
| WO | 2009/016281 | 2/2009 |

OTHER PUBLICATIONS

Office action from U.S. Appl. No. 12/119,937 dated Apr. 3, 2012.
(Continued)

*Primary Examiner* — Nathan Van Sell
(74) *Attorney, Agent, or Firm* — Calfee, Halter & Griswold LLP

(57) ABSTRACT

A laminated asphalt shingle including a base layer, a first decorative layer, and a second decorative layer is provided. The first decorative layer may be affixed to the base layer and to the second decorative layer by a flexible adhesive that permits the first decorative layer to move relative to both the base layer and the second decorative layer without de-bonding. The relative movement of the shingle layers permits the shingle to be folded over the ridge line of a roof without de-bonding or breaking the layers. Additionally, the relative movement of the layers when the shingle is installed over a ridge creates opposing transverse edges in which each layer is offset from the other layers as a result of the shingle bending about a different radius of curvature, thereby providing a dimensional appearance along the transverse edges.

11 Claims, 3 Drawing Sheets

(51) Int. Cl.
  *B32B 3/26* (2006.01)
  *B32B 7/12* (2006.01)
  *C08L 95/00* (2006.01)
  *E04D 1/20* (2006.01)
  *E04D 1/26* (2006.01)
  *E04D 1/22* (2006.01)
  *E04D 1/34* (2006.01)
  *C08L 53/00* (2006.01)
  *C08L 55/00* (2006.01)

(52) U.S. Cl.
  CPC .............. *C08L 95/00* (2013.01); *E04D 1/20* (2013.01); *E04D 1/22* (2013.01); *E04D 1/26* (2013.01); *E04D 1/3402* (2013.01); *B32B 2255/24* (2013.01); *B32B 2255/26* (2013.01); *B32B 2307/546* (2013.01); *B32B 2419/06* (2013.01); *C08L 53/00* (2013.01); *C08L 55/00* (2013.01); *E04D 2001/347* (2013.01); *E04D 2001/3435* (2013.01); *Y10T 428/24025* (2015.01)

(56) References Cited

U.S. PATENT DOCUMENTS

| | | |
|---|---|---|
| 356,161 A | 1/1887 | Ricketson |
| D48,172 S | 11/1915 | Deun Lany |
| 1,495,070 A | 5/1924 | Finley |
| 1,516,243 A | 11/1924 | Perry |
| 1,549,723 A | 8/1925 | Mattison |
| 1,583,563 A | 5/1926 | Abraham |
| 1,585,693 A | 5/1926 | Robinson |
| 1,597,135 A | 8/1926 | Wittenberg |
| 1,601,731 A | 10/1926 | Flood |
| 1,665,222 A | 4/1928 | Robinson |
| 1,666,429 A | 4/1928 | 5tolp, Jr. |
| 1,676,351 A | 7/1928 | Robinson |
| 1,698,891 A | 1/1929 | Overbury |
| 1,701,926 A | 2/1929 | Kirschbraun |
| 1,799,500 A | 4/1931 | Brophy |
| 1,802,868 A | 4/1931 | Roscoe |
| 1,843,370 A | 2/1932 | Overbury |
| 1,447,750 A | 5/1932 | Bird |
| 1,860,899 A | 5/1932 | Denton |
| 1,885,346 A | 11/1932 | Hersherger |
| 1,897,139 A | 2/1933 | Overbury |
| 1,898,989 A | 2/1933 | Harshberger |
| 1,984,529 A | 12/1934 | Harshberger |
| 2,058,167 A | 10/1936 | Walter McQuade |
| 2,161,440 A | 6/1939 | Venrick |
| 2,490,430 A | 12/1949 | Greider et al. |
| 2,630,574 A | 3/1953 | Malarkey |
| 2,798,006 A | 7/1957 | Oldfield et al. |
| 2,847,948 A | 8/1958 | Truitt |
| 3,054,222 A | 9/1961 | Buckner |
| 3,127,701 A | 4/1964 | Jastrzemski |
| 3,138,897 A | 6/1964 | McCorkle |
| 3,252,257 A | 5/1966 | Price et al. |
| 3,332,830 A | 7/1967 | Tomlinson et al. |
| 3,377,762 A | 4/1968 | Chalmers |
| 3,468,086 A | 9/1969 | Warner |
| 3,468,092 A | 9/1969 | Chalmers |
| 3,624,975 A | 12/1971 | Morgan et al. |
| 3,664,081 A | 5/1972 | Martin et al. |
| 3,813,280 A | 5/1974 | Olszyk et al. |
| 3,913,294 A | 10/1975 | Freiborg |
| 4,091,135 A | 5/1978 | Tajima et al. |
| 4,194,335 A | 3/1980 | Diamond |
| 4,195,461 A | 4/1980 | Thiis-Evensen |
| 4,274,243 A | 6/1981 | Corbin et al. |
| 4,301,633 A | 11/1981 | Neumann |
| 4,307,552 A | 12/1981 | Votte |
| 4,333,279 A | 6/1982 | Corbin et al. |
| D265,510 S | 7/1982 | Bedwell, Jr. |
| 4,352,837 A | 10/1982 | Kopenhaver |
| 4,366,197 A | 12/1982 | Hanlon et al. |
| 4,404,783 A | 9/1983 | Freiborg |
| 4,434,589 A | 3/1984 | Freiborg |
| 4,439,955 A | 4/1984 | Freiborg |
| 4,459,157 A | 7/1984 | Koons |
| 4,527,374 A | 7/1985 | Corbin |
| 4,580,389 A | 4/1986 | Freiborg |
| 4,637,191 A | 1/1987 | Smith |
| 4,672,790 A | 6/1987 | Freiborg |
| 4,680,909 A | 7/1987 | Stewart |
| 4,706,435 A | 11/1987 | Stewart |
| 4,717,614 A | 1/1988 | Bondoc et al. |
| 4,738,884 A | 4/1988 | Algrim et al. |
| 4,755,545 A | 7/1988 | Lalwani |
| 4,789,066 A | 12/1988 | Lisiecki |
| D300,257 S | 3/1989 | Stahl |
| 4,817,358 A | 4/1989 | Lincoln et al. |
| 4,824,880 A | 4/1989 | Algrim et al. |
| 4,835,929 A * | 6/1989 | Bondoc .............. E04D 1/30 52/276 |
| 4,848,057 A | 7/1989 | MacDonald et al. |
| 4,856,251 A | 8/1989 | Buck |
| 4,869,942 A | 9/1989 | Jennus et al. |
| D309,027 S | 7/1990 | Noone et al. |
| D313,278 S | 12/1990 | Noone |
| 5,036,119 A | 7/1991 | Berggren |
| 5,039,755 A | 8/1991 | Chamberlain et al. |
| 5,065,553 A | 11/1991 | Magid |
| 5,082,704 A | 1/1992 | Higgins |
| 5,094,042 A * | 3/1992 | Freborg .............. E04D 1/20 52/57 |
| 5,181,361 A | 1/1993 | Hannah et al. |
| 5,195,290 A | 3/1993 | Hulett |
| 5,209,802 A | 5/1993 | Hannah et al. |
| 5,232,530 A | 8/1993 | Malmquist et al. |
| 5,239,802 A | 8/1993 | Robinson |
| 5,247,771 A | 9/1993 | Poplin |
| D340,294 S | 10/1993 | Hannah et al. |
| 5,271,201 A | 12/1993 | Noone et al. |
| 5,295,340 A | 3/1994 | Collins |
| D347,900 S | 6/1994 | Stapleton |
| 5,319,898 A | 6/1994 | Freiborg |
| 5,365,711 A | 11/1994 | Pressutti et al. |
| 5,369,929 A | 12/1994 | Weaver et al. |
| 5,375,387 A | 12/1994 | Davenport |
| 5,375,388 A | 12/1994 | Poplin |
| 5,400,558 A | 3/1995 | Hannah et al. |
| 5,419,941 A | 5/1995 | Noone et al. |
| 5,426,902 A | 6/1995 | Stahl et al. |
| 5,467,568 A | 11/1995 | Sieling |
| 5,471,801 A | 12/1995 | Kupczyk et al. |
| D366,124 S | 1/1996 | Hannah et al. |
| 5,488,807 A | 2/1996 | Terrenzio et al. |
| D369,421 S | 4/1996 | Kiik et al. |
| D375,563 S | 11/1996 | Hannah et al. |
| 5,570,556 A | 11/1996 | Wagner |
| 5,571,596 A | 11/1996 | Johnson |
| 5,575,876 A | 11/1996 | Noone et al. |
| 5,577,361 A | 11/1996 | Grabek, Jr. |
| D376,660 S | 12/1996 | Hannah et al. |
| 5,611,186 A | 3/1997 | Weaver |
| 5,615,523 A | 4/1997 | Wells et al. |
| 5,624,522 A | 4/1997 | Belt et al. |
| D379,672 S | 6/1997 | Lamb et al. |
| 5,651,734 A | 7/1997 | Morris |
| 5,660,014 A | 8/1997 | Stahl et al. |
| D383,223 S | 9/1997 | Sieling et al. |
| 5,664,385 A | 9/1997 | Koschitzky |
| 5,666,776 A | 9/1997 | Weaver et al. |
| 5,676,597 A | 10/1997 | Bettoli et al. |
| 5,711,126 A | 1/1998 | Wells et al. |
| 5,746,830 A | 5/1998 | Burton |
| 5,795,389 A | 8/1998 | Koschitzky |
| 5,799,459 A | 9/1998 | Covert |
| D400,268 S | 10/1998 | Sieling et al. |
| 5,822,943 A | 10/1998 | Frankoski et al. |
| D400,981 S | 11/1998 | Bondoc et al. |
| D403,087 S | 12/1998 | Sieling et al. |

(56) References Cited

U.S. PATENT DOCUMENTS

| | | |
|---|---|---|
| 5,853,858 A | 12/1998 | Bondoc |
| 5,860,263 A | 1/1999 | Sieling et al. |
| D406,361 S | 3/1999 | Bondoc et al. |
| 5,901,517 A | 5/1999 | Stahl et al. |
| 5,916,103 A | 6/1999 | Roberts |
| 5,939,169 A | 8/1999 | Bondoc et al. |
| 5,950,387 A | 9/1999 | Stahl et al. |
| D417,016 S | 11/1999 | Moore et al. |
| D417,513 S | 12/1999 | Blanpied |
| 6,010,589 A | 1/2000 | Stahl et al. |
| 6,014,847 A | 1/2000 | Phillips |
| 6,021,611 A | 2/2000 | Wells et al. |
| 6,038,826 A | 3/2000 | Stahl et al. |
| 6,044,608 A | 4/2000 | Stahl et al. |
| 6,070,384 A | 6/2000 | Chich |
| 6,083,592 A | 7/2000 | Chich |
| 6,105,329 A | 8/2000 | Bondoc et al. |
| RE36,858 E | 9/2000 | Pressutti et al. |
| 6,112,492 A | 9/2000 | Wells et al. |
| 6,125,602 A | 10/2000 | Freiborg et al. |
| 6,145,265 A | 11/2000 | Malarkey et al. |
| 6,148,578 A | 11/2000 | Nowacek et al. |
| 6,156,289 A | 12/2000 | Chopra |
| 6,182,400 B1 | 2/2001 | Freiborg et al. |
| 6,185,895 B1 | 2/2001 | Rettew |
| 6,190,754 B1 | 2/2001 | Bondoc et al. |
| 6,199,338 B1 | 3/2001 | Hudson, Jr. et al. |
| 6,220,329 B1 | 4/2001 | King et al. |
| 6,247,289 B1 | 6/2001 | Karpinia |
| 6,253,512 B1 | 7/2001 | Thompson et al. |
| 6,310,122 B1 | 10/2001 | Butler et al. |
| 6,343,447 B2 | 2/2002 | Geissels et al. |
| 6,351,913 B1 | 3/2002 | Freiborg et al. |
| 6,355,132 B1 | 3/2002 | Becker et al. |
| 6,361,851 B1 | 3/2002 | Sieling et al. |
| 6,397,546 B1 | 6/2002 | Malarkey et al. |
| 6,397,556 B1 | 6/2002 | Karpinia |
| 6,401,425 B1 | 6/2002 | Frame |
| 6,426,309 B1 | 7/2002 | Miller et al. |
| 6,467,235 B2 | 10/2002 | Kalkanoglu et al. |
| 6,471,812 B1 | 10/2002 | Thompson et al. |
| D466,629 S | 12/2002 | Phillips |
| 6,487,828 B1 | 12/2002 | Phillips |
| 6,494,010 B1* | 12/2002 | Brandon .............. E04D 1/20 52/518 |
| 6,510,664 B2 | 1/2003 | Kupczyk |
| 6,523,316 B2 | 2/2003 | Stahl et al. |
| 6,530,189 B2 | 3/2003 | Freshwater et al. |
| D473,326 S | 4/2003 | Phillips |
| 6,565,431 B1 | 5/2003 | Villela |
| 6,578,336 B2 | 6/2003 | Elliott |
| 6,610,147 B2 | 8/2003 | Aschenbeck |
| 6,652,909 B2 | 11/2003 | Lassiter |
| 6,679,020 B2 | 1/2004 | Becker et al. |
| 6,679,308 B2 | 1/2004 | Becker et al. |
| 6,691,489 B2 | 2/2004 | Frame |
| 6,703,120 B1 | 3/2004 | Ko |
| 6,708,456 B2 | 3/2004 | Kiik et al. |
| 6,709,760 B2* | 3/2004 | Trumbore ............ B32B 11/00 428/147 |
| 6,709,994 B2 | 3/2004 | Miller et al. |
| 6,725,609 B2 | 4/2004 | Freiborg et al. |
| 6,758,019 B2 | 7/2004 | Kalkanoglu et al. |
| 6,759,454 B2 | 7/2004 | Stephens et al. |
| 6,790,307 B2 | 9/2004 | Elliott |
| 6,804,919 B2 | 10/2004 | Railkar |
| 6,813,866 B2 | 11/2004 | Naipawer, III |
| 6,823,637 B2 | 11/2004 | Elliott et al. |
| 6,895,724 B2 | 5/2005 | Naipawer, III |
| 6,933,037 B2 | 8/2005 | McCumber et al. |
| 6,936,329 B2 | 8/2005 | Kiik et al. |
| 6,990,779 B2 | 1/2006 | Kiik et al. |
| 7,021,468 B2 | 4/2006 | Cargile, Jr. |
| 7,029,739 B2 | 4/2006 | Weinstein et al. |
| 7,048,990 B2 | 5/2006 | Koschitzky |
| 7,070,051 B2 | 7/2006 | Kanner et al. |
| 7,073,295 B2 | 7/2006 | Pressutti et al. |
| 7,082,724 B2 | 8/2006 | Railkar et al. |
| 7,118,794 B2 | 10/2006 | Kalkanoglu et al. |
| 7,121,055 B2 | 10/2006 | Penner |
| 7,124,548 B2 | 10/2006 | Pressutti et al. |
| 7,146,771 B2 | 12/2006 | Swann |
| 7,165,363 B2 | 1/2007 | Headrick et al. |
| 7,238,408 B2 | 7/2007 | Aschenbeck et al. |
| 7,267,862 B1 | 9/2007 | Burke et al. |
| 7,282,536 B2* | 10/2007 | Handlin, Jr. ......... C08F 287/00 525/258 |
| 7,556,849 B2 | 7/2009 | Thompson et al. |
| D610,720 S | 2/2010 | Elliott |
| 7,765,763 B2 | 8/2010 | Teng et al. |
| 7,781,046 B2 | 8/2010 | Kalkanoglu et al. |
| 7,805,905 B2 | 10/2010 | Rodrigues et al. |
| 7,820,237 B2 | 10/2010 | Harrington, Jr. |
| 7,836,654 B2 | 11/2010 | Belt et al. |
| D633,221 S | 2/2011 | Koch |
| D633,222 S | 2/2011 | Koch |
| 7,877,949 B1 | 2/2011 | Elliott |
| 7,909,235 B2 | 3/2011 | Holley, Jr. |
| 7,921,606 B2 | 4/2011 | Quaranta et al. |
| 8,006,457 B2 | 8/2011 | Binkley et al. |
| 8,127,514 B2 | 3/2012 | Binkley et al. |
| 8,181,413 B2 | 5/2012 | Belt et al. |
| 8,216,407 B2 | 7/2012 | Kalkanoglu et al. |
| 8,240,102 B2 | 8/2012 | Belt et al. |
| 8,266,861 B2 | 9/2012 | Koch et al. |
| 8,281,520 B2 | 10/2012 | Quaranta et al. |
| 8,281,539 B2 | 10/2012 | Kalkanoglu |
| 8,302,358 B2 | 11/2012 | Kalkanoglu |
| 8,316,608 B2 | 11/2012 | Binkley et al. |
| 8,323,440 B2 | 12/2012 | Koch et al. |
| 8,371,072 B1 | 2/2013 | Shanes et al. |
| 8,371,085 B2 | 2/2013 | Koch |
| 8,453,408 B2 | 6/2013 | Kalkanoglu et al. |
| D695,925 S | 12/2013 | Ray |
| D711,558 S | 8/2014 | Bobolts |
| D735,545 S | 8/2015 | Rampling |
| 2001/0000372 A1 | 4/2001 | Kalkanoglu et al. |
| 2001/0049002 A1 | 12/2001 | McCumber et al. |
| 2002/0000068 A1* | 1/2002 | Freiborg ............... E04D 1/30 52/57 |
| 2002/0038531 A1 | 4/2002 | Freshwater et al. |
| 2002/0078651 A1 | 6/2002 | Freshwater et al. |
| 2002/0114913 A1 | 8/2002 | Weinstein et al. |
| 2003/0040241 A1 | 2/2003 | Kiik et al. |
| 2003/0070579 A1 | 4/2003 | Hong et al. |
| 2003/0093958 A1 | 5/2003 | Freiborg et al. |
| 2003/0093963 A1 | 5/2003 | Stahl et al. |
| 2003/0124292 A1 | 7/2003 | Unterreiter |
| 2003/0138601 A1 | 7/2003 | Elliott |
| 2003/0196389 A1 | 10/2003 | Naipawer |
| 2004/0055240 A1 | 3/2004 | Kiik et al. |
| 2004/0055241 A1 | 3/2004 | Railkar |
| 2004/0079042 A1 | 4/2004 | Elliott |
| 2004/0083672 A1* | 5/2004 | Penner ................. E04D 1/30 52/518 |
| 2004/0083673 A1 | 5/2004 | Kalkanoglu et al. |
| 2004/0083674 A1 | 5/2004 | Kalkanoglu et al. |
| 2004/0109971 A1 | 6/2004 | Weinstein et al. |
| 2004/0111996 A1 | 6/2004 | Heronome |
| 2004/0123537 A1 | 7/2004 | Elliott et al. |
| 2004/0123543 A1 | 7/2004 | Elliott et al. |
| 2004/0148874 A1 | 8/2004 | Jolitz et al. |
| 2004/0172908 A1 | 9/2004 | Swann |
| 2004/0206012 A1 | 10/2004 | Pressutti et al. |
| 2004/0206035 A1 | 10/2004 | Kandaigaonkar |
| 2004/0258883 A1 | 12/2004 | Weaver |
| 2005/0005555 A1 | 1/2005 | Naipawer |
| 2005/0137295 A1 | 6/2005 | Kendrick et al. |
| 2005/0193673 A1 | 9/2005 | Rodrigues et al. |
| 2005/0204675 A1 | 9/2005 | Snyder et al. |
| 2005/0210808 A1 | 9/2005 | Larson et al. |
| 2005/0235599 A1 | 10/2005 | Kalkanoglu et al. |
| 2005/0252136 A1 | 11/2005 | Hardin |
| 2006/0032174 A1 | 2/2006 | Floyd |

(56) References Cited

U.S. PATENT DOCUMENTS

| | | | |
|---|---|---|---|
| 2006/0175386 A1 | 8/2006 | Holley, Jr. | |
| 2006/0179767 A1 | 8/2006 | Miller et al. | |
| 2006/0201094 A1 | 9/2006 | Lassiter | |
| 2006/0265990 A1 | 11/2006 | Kalkanoglu et al. | |
| 2007/0020436 A1 | 1/2007 | Teng et al. | |
| 2007/0039274 A1 | 2/2007 | Harrington et al. | |
| 2007/0042158 A1 | 2/2007 | Belt et al. | |
| 2007/0107372 A1 | 5/2007 | Harrington, Jr. | |
| 2007/0144077 A1* | 6/2007 | Quaranta | E04D 1/30 52/43 |
| 2007/0179220 A1 | 8/2007 | Sasagawa et al. | |
| 2007/0266665 A1 | 11/2007 | Todd et al. | |
| 2008/0134612 A1 | 6/2008 | Koschitzky | |
| 2009/0038257 A1 | 2/2009 | Todd et al. | |
| 2009/0139175 A1 | 6/2009 | Todd et al. | |
| 2009/0282767 A1 | 11/2009 | Grubka | |
| 2010/0077689 A1 | 4/2010 | Kalkanoglu et al. | |
| 2010/0143667 A1 | 6/2010 | Collins et al. | |
| 2010/0192496 A1 | 8/2010 | Koch et al. | |
| 2010/0192500 A1 | 8/2010 | Koch | |
| 2010/0212240 A1 | 8/2010 | Grubka | |
| 2010/0212246 A1 | 8/2010 | Grubka | |
| 2010/0218433 A1 | 9/2010 | Quranta et al. | |
| 2010/0236178 A1 | 9/2010 | Loftus | |
| 2010/0239807 A1 | 9/2010 | Grubka | |
| 2010/0310825 A1 | 12/2010 | Kalkanoglu et al. | |
| 2010/0313512 A1 | 12/2010 | Rodrigues et al. | |
| 2011/0005158 A1 | 1/2011 | Kailey et al. | |
| 2011/0126485 A1 | 6/2011 | Bleil et al. | |
| 2011/0151170 A1 | 6/2011 | Grubka et al. | |
| 2011/0209428 A1 | 9/2011 | Elliott | |
| 2011/0214378 A1 | 9/2011 | Grubka | |
| 2011/0319533 A1 | 12/2011 | Gauthier et al. | |
| 2013/0177728 A1 | 7/2013 | Grubka et al. | |
| 2016/0017608 A1 | 1/2016 | Grubka | |
| 2016/0024792 A1 | 1/2016 | Grubka | |

OTHER PUBLICATIONS

Office action from U.S. Appl. No. 12/119,937 dated Apr. 14, 2010.
Office action from U.S. Appl. No. 12/119,937 dated Nov. 4, 2010.
Office action from U.S. Appl. No. 12/392,392 dated Mar. 4, 2010.
Office action from U.S. Appl. No. 12/392,392 dated Jun. 14, 2012.
Office action from U.S. Appl. No. 12/392,392 dated Jul. 19, 2012.
Office action from U.S. Appl. No. 12/392,392 dated Aug. 18, 2011.
Office action from U.S. Appl. No. 12/392,392 dated Sep. 13, 2010.
Office action from U.S. Appl. No. 12/392,392 dated Nov. 21, 2011.
Office action from U.S. Appl. No. 12/392,392 dated Dec. 22, 2010.
Office action from U.S. Appl. No. 12/702,457 dated May 7, 2014.
Office action from U.S. Appl. No. 12/702,457 dated Jun. 18, 2012.
Office action from U.S. Appl. No. 12/702,457 dated Jul. 20, 2012.
Office action from U.S. Appl. No. 12/702,457 dated Nov. 21, 2013.
Office action from U.S. Appl. No. 12/702,457 dated Dec. 3, 2014.
Office action from U.S. Appl. No. 12/717,519 dated May 1, 2012.
Office action from U.S. Appl. No. 12/717,519 dated Jun. 12, 2014.
Office action from U.S. Appl. No. 12/717,519 dated Oct. 3, 2011.
Office action from U.S. Appl. No. 12/717,519 dated Dec. 12, 2014.
Office action from U.S. Appl. No. 12/727,459 dated Jan. 26, 2015.
Office action from U.S. Appl. No. 12/727,459 dated Jan. 10, 2014.
Office action from U.S. Appl. No. 12/727,459 dated Jan. 19, 2012.
Office action from U.S. Appl. No. 12/727,459 dated May 25, 2011.
Office action from U.S. Appl. No. 12/727,459 dated May 30, 2012.
Office action from U.S. Appl. No. 12/727,459 dated Jun. 6, 2014.
Office action from U.S. Appl. No. 12/727,459 dated Jul. 11, 2013.
Office action from U.S. Appl. No. 12/727,459 dated Aug. 30, 2011.
Office action from U.S. Appl. No. 12/727,459 dated Oct. 3, 2012.
Office action from U.S. Appl. No. 12/727,470 dated Aug. 10, 2012.
Office action from U.S. Appl. No. 12/727,470 dated Apr. 10, 2013.
Office action from U.S. Appl. No. 12/727,470 dated May 26, 2015.
Office action from U.S. Appl. No. 12/727,470 dated Feb. 11, 2016.
Office action from U.S. Appl. No. 12/831,130 dated Feb. 29, 2012.
Office action from U.S. Appl. No. 12/831,130 dated Jun. 14, 2012.
Office action from U.S. Appl. No. 12/831,130 dated Aug. 9, 2012.
Office action from U.S. Appl. No. 13/019,028 dated Jun. 21, 2012.
Office action from U.S. Appl. No. 13/019,028 dated Aug. 10, 2011.
Office action from U.S. Appl. No. 13/019,028 dated Dec. 19, 2012.
Office action from U.S. Appl. No. 13/039,726 dated Feb. 5, 2014.
Office action from U.S. Appl. No. 13/039,726 dated Aug. 14, 2014.
Office action from U.S. Appl. No. 13/193,864 dated Nov. 4, 2013.
Office action from U.S. Appl. No. 13/344,025 date Feb. 26, 2015.
Office action from U.S. Appl. No. 13/344,025 dated Feb. 5, 2013.
Office action from U.S. Appl. No. 13/344,025 dated Mar. 27, 2014.
Office action from U.S. Appl. No. 13/344,025 dated Aug. 16, 2013.
Office action from U.S. Appl. No. 13/344,025 dated Sep. 24, 2014.
Interview Summary from U.S. Appl. No. 13/344,025 dated Jul. 30, 2014.
Office action from U.S. Appl. No. 13/344,025 dated Feb. 26, 2015.
Interview Summary from U.S. Appl. No. 13/344,025 dated May 21, 2015.
Notice of Allowance from U.S. Appl. No. 13/344,025 dated Nov. 6, 2015.
Supplemental Allowance from U.S. Appl. No. 13/344,025 dated Nov. 23, 2015.
Office action from U.S. Appl. No. 29/483,307 dated Sep. 15, 2015.
Notice of Allowance from U.S. Appl. No. 29/483,307 dated Feb. 11, 2016.
Office action from U.S. Appl. No. 13/193,864 dated May 15, 2013.
Office action U.S. Appl. No. 12/727,459 dated Jan. 26, 2015.
Notice of Allowance from U.S. Appl. No. 14/751,334 dated Apr. 8, 2016.
Office action from Canadian Application No. 2,697,221 dated Feb. 2, 2016.
Office action from Canadian Application No. 2,753,250 dated Nov. 26, 2015.
Office action from Canadian Application No. 2,697,223 dated Jan. 12, 2016.
Advisory action from U.S. Appl. No. 09/515,928 dated Feb. 22, 2005.
Advisory action from U.S. Appl. No. 09/515,928 dated Jun. 7, 2002.
Advisory action from U.S. Appl. No. 09/515,928 dated Jul. 19, 2007.
Advisory action from U.S. Appl. No. 12/119,937 dated Jan. 19, 2011.
Advisory Action from U.S. Appl. No. 12/392,392 dated Feb. 27, 2012.
Advisory Action from U.S. Appl. No. 12/392,392 dated Dec. 14, 2010.
Advisory Action from U.S. Appl. No. 12/702,457 dated Aug. 27, 2014.
Advisory action from U.S. Appl. No. 12/727,459 dated Dec. 13, 2012.
Advisory action from U.S. Appl. No. 13/039,726 dated Oct. 28, 2014.
Decision on Appeal from U.S. Appl. No. 09/515,928 dated Jul. 28, 2010.
Examiner's Answer from U.S. Appl. No. 09/515,928 dated Jun. 18, 2008.
Haynes, Shellflex 3681 MSDS, Jan. 4, 1999, 5 pgs.
Interview Summary from U.S. Appl. No. 12/392,392 dated Feb. 3, 2011.
Interview Summary from U.S. Appl. No. 12/702,457 dated Feb. 26, 2014.
Interview Summary from U.S. Appl. No. 12/702,457 dated Jul. 31, 2014.
Interview Summary from U.S. Appl. No. 12/702,457 dated Mar. 4, 2015.
Interview Summary from U.S. Appl. No. 12/727,459 dated Apr. 13, 2012.
Interview Summary from U.S. Appl. No. 12/727,459 dated Dec. 28, 2011.
Interview Summary from U.S. Appl. No. 13/039,726 dated Oct. 28, 2014.
Notice of Allowance from U.S. Appl. No. 13/039,726 dated Jan. 22, 2015.

(56) References Cited

OTHER PUBLICATIONS

Interview Summary from U.S. Appl. No. 12/727,459 dated Aug. 19, 2014.
Notice of Allowance from U.S. Appl. No. 09/515,928 dated Sep. 27, 2010.
Notice of Allowance from U.S. Appl. No. 12/702,457 dated May 26, 2015.
Notice of Allowance from U.S. Appl. No. 12/717,519 dated Apr. 2, 2015.
Notice of Panel Decision from Pre-Appeal Brief Review from U.S. Appl. No. 09/515,928 dated Feb. 8, 2008.
Office action from U.S. Appl. No. 09/515,928 dated Jan. 2, 2002.
Office action from U.S. Appl. No. 09/515,928 dated Mar. 15, 2001.
Office action from U.S. Appl. No. 09/515,928 dated Apr. 20, 2007.
Office action from U.S. Appl. No. 09/515,928 dated Apr. 25, 2006.
Office action from U.S. Appl. No. 09/515,928 dated Sep. 16, 2004.
Office action from U.S. Appl. No. 09/515,928 dated Sep. 19, 2007.
Office action from U.S. Appl. No. 09/515,928 dated Oct. 11, 2001.
Office action from U.S. Appl. No. 09/515,928 dated Oct. 11, 2006.
Office action from U.S. Appl. No. 09/515,928 dated Dec. 2, 2005.
Office action from Canadian Application No. 2,697,223 dated Aug. 25, 2016.

* cited by examiner

FLEXIBLE LAMINATED HIP AND RIDGE SHINGLE

CROSS-REFERENCE TO RELATED APPLICATIONS

This application is a continuation application of U.S. Ser. No. 12/727,459 entitled "Flexible Laminated Hip and Ridge Shingle" filed Mar. 19, 2010, which is related to and claims domestic priority benefits from U.S. Provisional Patent Application Ser. No. 61/161,996 entitled "Low Temperature Shingle Sealant Composition" filed Mar. 20, 2009 and U.S. Provisional Patent Application Ser. No. 61/162,111 entitled "Low Temperature Shingle Sealant composition" filed Mar. 20, 2009, the entire contents of which are expressly incorporated herein by reference in their entireties.

TECHNICAL FIELD AND INDUSTRIAL APPLICABILITY

The present invention relates generally to roofing shingles, and more particularly, to a flexible laminating adhesive for use with a multi-layered shingled product that permits the shingle product to be bent, such as over an apex of a roof, without cracking or breaking. In addition, flexible adhesive provides flexibility at temperatures lower than or equal to about 40° F.

BACKGROUND

Roofs are typically formed so as to present at least two non-parallel planes that meet at a peak, usually the uppermost point of the roof. This peak is typically referred to as the ridge. Roofs can also be formed to present other non-parallel planes that are often formed at the ends of the ridge to form other diagonally-extending plane intersections similar to the ridge, but are referred to as hips. Whereas, the covering of the planar portions of a roof typically involve the laying of shingles in overlapping, transversely parallel courses from the bottom roof edge to the ridge or hip, the ridges and hips require a different technique to cover the intersection of the two or more roof planes. A conventional technique for covering the ridges and hips is to cut the shingles into appropriate width and to bend the cut shingle over the ridge or hip so as to overlap the shingles placed on the opposing roof planes, and then starting at one end of the ridge or hip and overlap the cut shingles along the length of the ridge or hip.

Asphalt composite shingles are one of the most commonly used roofing products. These asphalt composite shingles typically incorporate a base material made from a fiberglass mat, or other suitable reinforcement member, such as an organic felt material. This reinforcing base material serves as a matrix to support an asphalt coating and gives the shingle strength. The asphalt coating is formulated for the particular service application and has a long-term ability to resist weathering and provide stability for the structure under extreme temperature conditions. An outer layer of granules is applied to the asphalt coating to form an outer surface that the asphalt coating from direct sunlight. This outer layer of granules also offers resistance to fire. Utilizing differently colored granules provides a variety in the surface appearance of the shingle to establish color variations.

Conventional laminated shingles, for example, as well as hip and ridge shingles, are generally multilayered and the separate, individual layers are held together with an adhesive material. One problem associated with conventional adhesives is that the adhesive can be too strong for a particular application. For instance, hip and ridge shingles are often formed of multiple layers or chips adhered to a base sheet in order to achieve a dimensional appearance when attached to a roof. However, when placing these multi-layered shingles along ridge or hip lines of a roof using conventional adhesives, a problem may occur when bending the shingle over the ridge or hip. In particular, because the thickest areas of the shingle include two or three layers of material, bending the shingle to cover the ridge or hip often results in a crack along the outer layer of the dimensional composite shingle, which compromises the integrity of the ridge or hip covering. Furthermore, if the adhesive holding the various layers together is too aggressive, the layers providing the dimensional appearance of the shingle may tear apart or otherwise cause the shingle to fail.

Thus, there exists a need in the art for an adhesive that will permit a multilayer shingle product to bend over the ridge or hip of a roof without failing, that does not pose any additional health or safety issues, is cost effective, and where the performance of the adhesive is sustainable over time

SUMMARY

In accordance with embodiments of the present invention, an adhesive composition that includes a base asphalt, a linear copolymer, and an oil is provided. In some exemplary embodiments, the adhesive composition also contains a radial copolymer and/or one or more fillers. The base asphalt used in the inventive adhesive composition may be a viscosity graded asphalt, such as AC-10 or AC-20, or a paving graded asphalt, such as PG58 or PG64. The linear copolymer has an A-B di-block or A-B-A tri-block structure where blocks A and B may individually represent (1) styrene and butadiene or (2) styrene and isoprene. The oil is a petroleum-based oil that both "softens" the asphalt in the composition and reduces the viscosity of the adhesive composition. In some exemplary embodiments, the adhesive composition also contains a radial copolymer having an $(A-B)_n$ radial structure, where n is an integer of at least 4, or a tri-block (A-B-A) radial structure having from 4-8 arms. The inventive adhesive composition permits a multilayered shingle to have a degree of flexibility, such as to permit the shingle to be bent over the ridge line or hip of a roof.

In other embodiments to shingles for use as a hip and ridge shingle that includes a base layer having a first length dimension and a first width dimension and a first decorative layer having a second length dimension and a second width dimension are provided. The first decorative layer is affixed to the base layer by a flexible adhesive that allows the first decorative layer to move relative to the base layer without cracking or breaking the first decorative layer. In the shingle, at least one of the second length dimension and second width dimension is the same as or smaller than the corresponding first length dimension and the first width dimension. In exemplary embodiments, a second decorative layer is affixed to the first decorative layer by the flexible adhesive. Similar to the first layer, the adhesive permits the second decorative layer to move relative to said first decorative layer without cracking or breaking either the first or second decorative layer. The second decorative layer may have a length and/or width dimension that is the same as or smaller than the corresponding length and width dimension of the first decorative layer. The adhesive composition includes a base asphalt, a linear copolymer, an oil, and optionally, a radial copolymer and/or one or more fillers. Additionally, the adhesive possesses sufficient flexibility and shear to permit a multilayered hip and ridge shingle to be bent over the ridge or hip of a roof without cracking or breaking, even at temperatures lower than or equal to about 40° F.

In yet other embodiments, hip and ridge shingles for covering a ridge line of a roof that includes (1) a base layer having a first length dimension and a first width dimension and (2) a first decorative layer having a second length dimension and a second width dimension where at least one of the second length and width dimensions is smaller than the corresponding first length and width dimensions are provided. The first decorative layer is affixed to the base layer by a flexible adhesive that allows a limited movement of the first decorative layer relative to the base layer to permit the first decorative layer to bend about a different radius of curvature than the base member when the hip and ridge shingle is bent over a ridge line. The hip and ridge shingle may also include a second decorative member affixed to the first decorative member by the flexible adhesive to allow a limited movement of the second decorative layer relative to the first decorative layer, thus allowing the second decorative layer to bend at a different radius of curvature than the first decorative layer. Additionally, each of the base layer, the first decorative layer, and the second decorative layer have opposing transverse edges that are offset when the hip and ridge shingle is installed on a ridge line or a hip of a roof.

It is an advantage of the present inventions that the adhesive composition is flexible such that the layers of a multilayer shingle can be bent over the ridge or hip of a roof with out breaking or cracking.

It is a further advantage of the present inventions that the adhesive provides for more flexibility at lower temperatures, such as temperatures lower than or equal to about 40° F.

It is also an advantage of the present inventions that the decorative layers of a laminated asphalt composite shingle are secured by a flexible adhesive that permits the decorative layers to shift transversely to allow the respective decorative layers to bend at different radii of curvature when the shingle is placed over a roof ridge or hip.

It is a further advantage of the present inventions that the respective decorative layers of a laminated asphalt composite shingle can bend at respective radii of curvature so that the decorative layers will not crack along the bend line.

It is yet another advantage of the present inventions that the adhesive composition does not pose any safety or health issues to workers involved in their manufacture and/or application.

It is also an advantage of the present inventions that the asphaltic adhesive is useful in winter applications and in colder climates.

It is an advantage of the present inventions that the individual layers of the shingle will bend at a radius of curvature that accommodates the thickness of the shingle being bent to cover the ridge or hip of a roof.

It is yet another advantage of the present inventions that the exposed portion of the hip and ridge shingle is positioned on the decorative layers of a previously laid hip and ridge single when affixed to a ridge or hip of a roof, thereby providing a three dimensional, aesthetically pleasing appearance.

It is a further advantage of the present inventions that the slipping of the individual decorative layers of a laminated composite shingle when bent to cover a ridge or hip of a roof results in an exposure of the underlying layer along the longitudinal length of the shingle.

The foregoing and other objects, features, and advantages of the inventions will appear more fully hereinafter from a consideration of the detailed description that follows.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION

Figure 1:
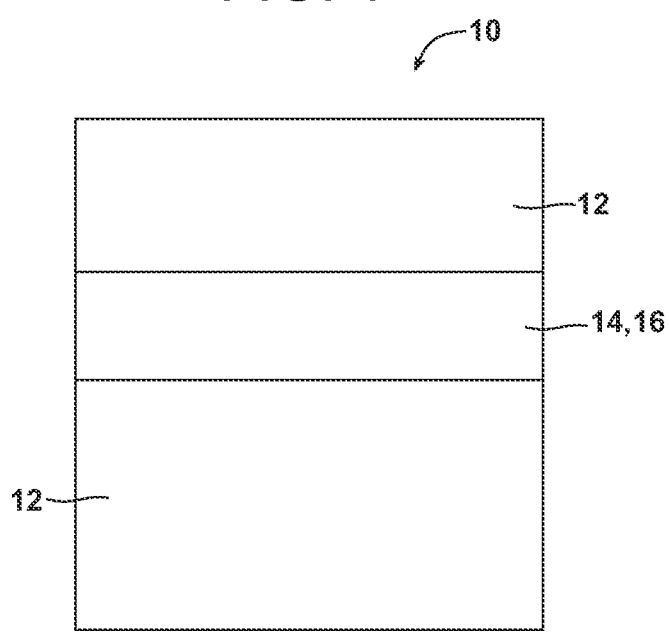
FIG. 1 is a schematic top plan view of an embodiment of a hip and ridge shingle formed according to the principles of the instant invention, the shingle being shown in a flat orientation with the decorative layers being representatively placed on a central portion of the shingle.

Unless defined otherwise, all technical and scientific terms used herein have the same meaning as commonly understood by one of ordinary skill in the art to which the invention belongs. All references cited herein, including published or corresponding U.S. or foreign patent applications, issued U.S. or foreign patents, or any other references, are each incorporated by reference in their entireties, including all data, tables, figures, and text presented in the cited references. The terms "adhesive", "inventive adhesive", "adhesive composition", "laminating adhesive", and "laminating adhesive composition" may interchangeably be used herein. In addition, the terms "cap shingle", "cap", or "hip and ridge shingle" may be used interchangeably herein.

The present inventions relate, at least in part, to a flexible adhesive composition for use with hip and ridge shingles (cap shingle) that includes a base asphalt, a linear copolymer, an oil, and, optionally, a radial copolymer and/or one or more fillers. The adhesive possesses sufficient flexibility and shear to permit a multilayered hip and ridge shingle to be bent over the ridge or hip of a roof without cracking or breaking. In addition, the adhesive provides for more flexibility at lower temperatures, such as temperatures lower than or equal to about 40° F.

The laminating adhesive composition contains, as one component, a base asphalt or other hydrocarbonaceous material. As used herein, the term "asphalt" is meant to include any of a variety of materials that are solid or semi-solid materials at room temperature that gradually liquefy when heated and are formed predominantly of naturally occurring bitumens obtained as residue in petroleum refining. The base asphalt used in the inventive adhesive composition is desirably a viscosity graded asphalt or an AC-10 paving grade asphalt such as PG58-22, which is commercially available British Petroleum and Conoco Philips and/or an AC-20 paving grade asphalt such as PG64-22, which is also commercially available from British Petroleum and Conoco Philips. The base asphalt may be generally present in the adhesive composition in an amount from about 79.0% to about 90.5% by weight of the composition. In exemplary embodiments, the base asphalt may be present in the adhesive composition in an amount from about 81% to about 88% by weight of the composition. As used herein, and unless defined otherwise, the phrase "% by weight" is meant to denote % by weight of the total adhesive composition.

As discussed above, the adhesive composition contains a linear copolymer, and, optionally, a radial copolymer, each of which is described in detail below. The copolymers are thermoplastic and are selected for their ability to impart strength to the adhesive at colder temperatures and to provide sufficient flexibility and/or shear. As with conventional thermoplastic organic polymers, the copolymers used in the inventive adhesive can be processed (i.e., melted and extruded) and can be repeatedly heated and cooled with no substantial loss in their properties, including elastomeric properties. Accordingly, the copolymers used herein substantially retain their properties when subjected to heating and cooling cycles. One particular advantageous feature is the ability of the copolymers to retain strength upon cooling the copolymers, which gives both strength and flexibility to the adhesive at colder temperatures.

The adhesive composition contains a linear copolymer having an A-B di-block or A-B-A tri-block structure. In particular, the linear copolymer has a di-block content greater than 50%. Blocks A and B may individually represent (1) styrene and butadiene or (2) styrene and isoprene. Either block, A or B, may include more than one monomer. Additionally, each block segment may include 100 or more monomer units. The linear copolymer may have a styrene content of less than 50%, from about 20% to about 40% styrene, or from about 20% to about 35% styrene. In some embodiments, the linear copolymer has a styrene/butadiene ratio of 33/67. In some examples the linear copolymer have styrene or polystyrene as the A block or end block units. Suitable copolymers include styrene-butadiene block copolymers and styrene-isoprene block copolymers. Specific, non-limiting examples include D1118K, a styrene-butadiene-styrene di-block copolymer, and D1113K, and D1119K, styrene-isoprene-styrene linear polymers with a high-di-block content (all are commercially available from Kraton®). In some examples, the linear copolymer is a styrene-butadiene di-block copolymer, such as D1118K, commercially available from Kraton®. The linear di-block copolymer may be present in the inventive adhesive composition in an amount from about 2.5% to about 11.0% by weight of the composition. In some embodiments, the linear copolymer is present in the adhesive composition in an amount from about 2.5% to about 6.5% by weight of the composition. In some exemplary embodiments, the linear copolymer may be present in the adhesive composition in a greater amount, such as, for example, from about 10.0-14.0% by weight of the composition, or from 11.0-12.0% by weight.

Optionally, the adhesive composition may contain a radial copolymer. The radial copolymer may have an $(A-B)_n$ radial structure, where n is an integer of at least 4, or from 4-20, or a tri-block (A-B-A) radial structure having from 4-8 arms. Block copolymers are well known and are described in numerous patents, including, for example, U.S. Pat. No. 4,738,884 to Algrim, et al., U.S. Pat. No. 4,824,880 to Algrim, et al., and U.S. Pat. No. 6,759,454 to Stephens, et al., each of which is incorporated by reference in their entirety. Similar to the linear copolymer, block A and/or B in the radial copolymer may include more than one monomer and each block segment may include 100 or more monomer units. Additionally, blocks A and B may individually represent (1) styrene and butadiene or (2) styrene and isoprene. It is desirable that the radial polymer have styrene or polystyrene as the A block or end block units. The radial copolymer may have a styrene content of less than 50%, from about 20% to about 40% styrene, or from about 20% to about 35% styrene. In some examples, the styrene/butadiene ratio is 31/69.

Exemplary radial copolymers include D4158K (includes 33% oil), D1184K, D1116K, and D1144K, all of which are styrene-butadiene-styrene (SBS) radial copolymers (commercially available from Kraton®), and D1124K and D1126P, both of which are styrene-isoprene radial copolymers (commercially available from Kraton®). In some embodiments, the radial copolymer is a styrene-butadiene radial copolymer, such as D4158K or D1184K (commercially available from Kraton®). The radial copolymer may be present in the adhesive composition in an amount from 0% to about 9.0% by weight of the composition. In exemplary embodiments, the radial copolymer may be present in the adhesive composition in an amount from about 3.5% to about 7.0% by weight of the composition.

When both a linear and a radial copolymer are present in the inventive adhesive, the total amount of the radial copolymer and the linear copolymer present in the adhesive composition may range from about 6.5% to about 14.0%, or from about 8.0% to about 11.0% of the total composition. Additionally, the ratio of radial copolymer to linear copolymer present in the adhesive composition may range from 6:3 to 2:6 (radial copolymer:linear copolymer). In some examples, the ratio of radial copolymer to linear copolymer present in the adhesive composition is 5:4.

Another component present in the adhesive composition is an oil. The oil can be any oil recognized in the art to enhance the "softness" of the asphalt in the adhesive composition. The oil also aids in reducing the viscosity of the adhesive composition. In general, the oil is added in an amount necessary to achieve a desired viscosity for the adhesive composition, and to improve flexibility and low temperature bonding. The viscosity of the adhesive composition desirably does not exceed approximately 1500 cps as measured by a Brookfield LVF Viscometer using spindle number 7 at 350° F. The oil utilized in the adhesive composition may be a petroleum-based oil or other naphthenic or paraffinic oils identified by one of ordinary skill in the art. One particularly useful oil is Hydrolene SP-125, a severely solvent modified heavy petroleum oil commercially available from Sunoco, Inc. (CAS No. 63741-88-4). The oil, in combination with the selected copolymers, acts to give the flexibility and shear so that the adhesive can be used in conjunction with hip and ridge shingles, even at colder temperatures. The oils and copolymer(s) permit the adhesive to flex and/or shear so that the layers of the hip and ridge shingle "slide" over each other upon bending and remain laminated together, without cracking or breaking the dimensional elements adhering to the base of the shingle. The oil may be present in the adhesive composition in a total amount from about 2.0% to about 7.0% of the total adhesive composition, or from about 4.0% to about 6.0%. It is to be appreciated that a portion of the total oil content may be derived from another component of the adhesive composition, such as, for example, an oil-containing copolymer.

In some exemplary embodiments, fillers may be added to any of the adhesive roofing sealant compositions. For example, up to about 30% by weight of a filler may be used. Suitable fillers include, but are not limited to, limestone (calcium carbonate), dolomite (calcium magnesium carbonate), wollastonite, talc, silica, and others known to those skilled in the art. The filler may have a median particle size from about 5 microns to about 50 microns, or from about 10 microns to about 30 microns.

One adhesive composition is set forth in Table 1.

TABLE 1

| Components of Roofing Shingle Adhesive Composition | % By Weight of Composition | Alternate % By Weight of Composition |
|---|---|---|
| PG64-22[1] | 79.0-86.0 | 82.0-84.0 |
| Kraton 1111[2] | 10.0-14.0 | 11.0-12.0 |
| Hydrolene SP-125[3] | 4.0-7.0 | 5.0-6.0 |

[1]performance grade asphalt (commercially available from British Petroleum and Conoco Philips)
[2]styrene-isoprene-styrene tri-block copolymer (commercially available from Kraton ®)
(4) petroleum-based oil (commercially available from Sunoco, Inc.)

A second adhesive composition is set forth in Table 2.

TABLE 2

| Components of Roofing Shingle Adhesive Composition | % By Weight of Composition | Alternate % By Weight of Composition |
|---|---|---|
| PG58-22[1] | 79.5-88.5 | 81.0-86.0 |
| Kraton 4158[2] | 5.55-8.55 | 6.3-7.8 |
| Kraton 1118[3] | 4.6-7.6 | 5.6-7.6 |
| Hydrolene SP-125[4] | 1.35-4.35 | 2.1-3.6 |

[1]performance grade asphalt (commercially available from British Petroleum and Conoco Philips)
[2]styrene-butadiene radial copolymer containing oil (commercially available from Kraton ®)
[3]styrene-butadiene di-block copolymer (commercially available from Kraton ®)
[4]petroleum-based oil (commercially available from Sunoco, Inc.)

A third adhesive composition is set forth in Table 3. The inventive adhesive compositions described herein can be reacted with elemental sulfur to vulcanize in situ. Table 3 depicts an exemplary composition containing a mixture of two linear copolymers (i.e., di-block and tri-block styrene-butadiene copolymers). After dispersion in the base asphalt and oil, the copolymer blend may be crosslinked with sulfur. The addition of the sulfur to polymer modified asphalts enhances dispersion stability and improves mechanical properties.

TABLE 3

| Components of Roofing Shingle Adhesive Composition | % By Weight of Composition | Alternate % By Weight of Composition |
|---|---|---|
| PG64-22[1] | 79.7-89.4 | 82.3-86.4 |
| Kraton 1101[2] | 4.0-8.0 | 6.0-7.0 |
| Kraton 1118[3] | 2.5-5.0 | 2.5-3.5 |
| Hydrolene SP-125[4] | 4.0-7.0 | 5.0-6.0 |
| Elemental sulfur | 0.1-0.3 | 0.1-0.2 |

[1]performance grade asphalt (commercially available from British Petroleum and Conoco Philips)
[2]styrene-butadiene-styrene linear tri-block copolymer (commercially available from Kraton ®)
[3]styrene-butadiene di-block copolymer (commercially available from Kraton ®)
[4]petroleum-based oil (commercially available from Sunoco, Inc.)

Conventional mixing or blending techniques may be used to make the adhesive composition. In at least one exemplary embodiment, the base asphalt is heated to a temperature of approximately 350° F. and the oil is blended into the molten asphalt. The linear copolymer is added to the molten asphalt/oil to form a mixture. If a radial copolymer is included in the composition, it may be added along with the linear copolymer. The mixture is then placed into a conventional milling apparatus where the polymers are sheared into smaller polymeric pieces. The mixture is ground in the milling apparatus for a period of time sufficient to mill (grind) the polymers to a size that is no longer visible to the naked eye under UV light. The adhesive composition is cooled for packaging and then melted for application to a shingle. It may be desirable to circulate and maintain the adhesive at an elevated temperature during processing and application to the shingles to aid in the prevention of phase separation.

Figure 2:
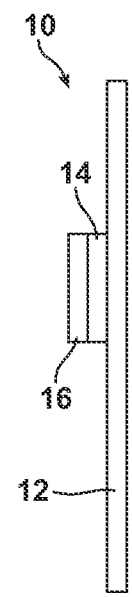
FIG. 2 is a schematic end elevational view of the hip and ridge shingle depicted in FIG. 1.
Figure 3:
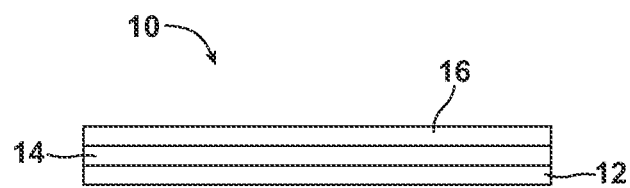
FIG. 3 is a schematic front elevational view of the hip and ridge shingle depicted in FIG. 1.

Turning to FIGS. 1-3, a hip and ridge shingle according to at least one exemplary embodiment of the invention can best be seen. The laminated hip and ridge shingle 10 may include a base layer 12. The base layer 12 may be formed in a conventional manner, and in some embodiments includes a reinforcement member, such as a fiberglass mat, on which asphalt and decorative granules are placed. As one example, chopped glass fibers may be dispersed into a water slurry which may contain surfactants, viscosity modifiers, or other chemical agents. The slurry containing the dispersed fibers is then deposited onto a moving screen where a substantial portion of the water is removed. Next, a binder (e.g., a urea formaldehyde binder or a polycarboxylic acid based binder) is applied, and the resulting mat is dried to remove the remaining water and cure the binder. The mat, formed of an assembly of randomly oriented, dispersed individual glass filaments, may be dried in any conventional manner, such as by passing the mat through an oven. Asphalt may then be applied to the dried/cured mat in any known manner, such as by passing the mat through a bath containing an asphalt mix that may include molten asphalt, fillers, and optionally sulfur, to place a layer of asphalt on at least one side of the mat and fill in the interstices between the individual glass fibers. The asphalt-coated mat is then cut to the appropriate shape and size to form the base layer 12. The hot, asphalt-coated mat may also be passed beneath one or more granule applicators that apply protective surface granules to portions of the asphalt-coated mat prior to cutting into the desired shape.

A similarly constructed first decorative or dimensional layer 14 is positioned on and adhered to the base layer 12 to provide a desired aesthetic appearance. Optionally, a second decorative (dimensional) layer 16 may be affixed on the first decorative layer 14 to provide greater depth to the composite shingle 10 and an enhanced three dimensional aesthetic appearance, particularly when viewed from a distance. It is to be appreciated that although the drawings reflect two decorative layers 14, 16 that are positioned across the width of the base layer 12, one skilled in the art will recognize that the decorative layers 14, 16 can be placed in any appropriate arrangement or orientation on the base layer 12 to provide a desired aesthetic appearance. Accordingly, the principles of the present invention are not limited to the specific location, size of the layers, or positioning of the decorative layers 14, 16, or the bending of the shingle to form a ridge or hip cap, as described in greater detail below, that requires the bending of all layers of the shingle irrespective of the location of the decorative layers 14, 16.

The respective layers 12, 14, 16 of the hip and ridge shingle 10 are adhered to one another via the flexible adhesive described in detail above. To form the hip and ridge shingle 10, the first decorative layer 14 is positioned at a desired location on the base layer 12 and affixed thereto with the inventive adhesive composition. The adhesive can be applied in a continuous or discontinuous fashion, such as in the form of beads or "dashes". In at least one embodiment (not illustrated), the first decorative layer 14 may be the same size or substantially the same size as the base layer 12. In other embodiments, the first decorative layer 14 may have a width that is smaller then the width of the base layer 12, such as is shown in FIGS. 1-3. In general, the first decorative layer 14 has a length and a width dimension and at least one of the length and width dimensions is smaller than the length and/or width dimension of the base layer 12. Subsequent layers, such as, for example, the second decorative layer 16, may have a length and/or a width dimension that is the same as or smaller that of the first decorative layer 14. For instance, the second decorative layer 16 may be affixed to the first decorative layer 14 such that the second layer 16 substantially covers the first decorative layer 14. As used herein, the phrase "substantially covers" is intended to denote that the second layer 16 completely covers or nearly completely covers the first decorative layer 14. In FIGS. 1-3, the first and second decorative layers have approximately the same length and width (i.e., are substantially the same size). Also, it is to be appreciated that the addition of the first and/or second decorative layer provides areas of greater thickness on the base layer, which provides a dimension to the shingle and an aesthetic appearance when viewed from a distance.

Figure 4:
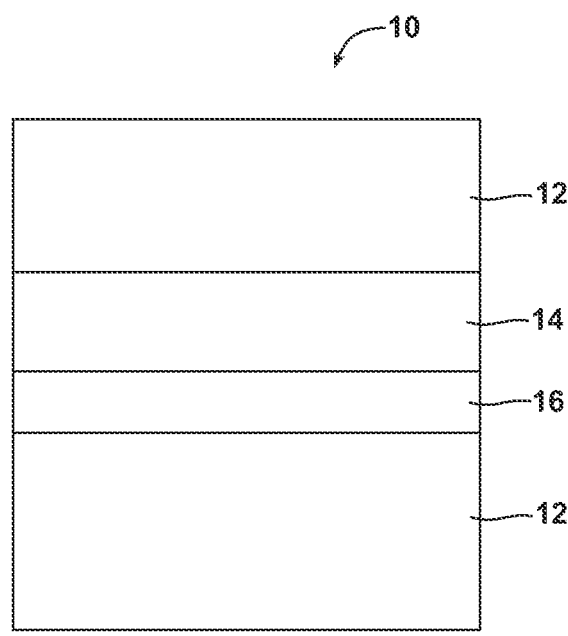
FIG. 4 is a schematic top plan view of an embodiment of a hip and ridge shingle formed according to the principles of the instant invention, the shingle being shown in a flat orientation with the decorative layers being representatively placed on a central portion of the shingle.
Figure 5:
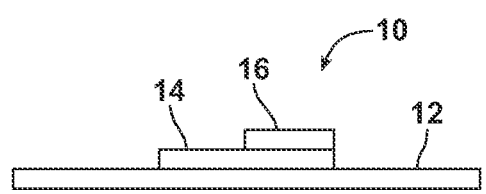
FIG. 5 is a schematic end elevational view of the hip and ridge shingle depicted in FIG. 4.

In an alternate embodiment, the second decorative layer 16 may have a length and/or a width dimension that is smaller than that of the first decorative layer 14 to offset the second decorative layer 14 from the first decorative layer 14 with only a partial overlap of the second decorative layer 16 on the first decorative layer. As shown in FIGS. 4 and 5, the first decorative layer 14 is affixed to the base layer 12 with the adhesive composition. The first decorative layer 14 has a size in a width dimension that is less than a size in the width dimension of the base layer 12. The second decorative layer 16, which has a size in the width dimension that is less than the width dimensions of both the first decorative layer 14 and the base layer 12, is affixed to the top surface of the second decorative layer 14 to form a hip and ridge shingle 10 in accordance with at least one embodiment of the invention. It is to be appreciated that any number of configurations of the arrangements of the first and second decorative layers 14, 16 on the base layer 12 and the sizes of the first and second decorative layers with respect to the base layer 12 are envisioned and are considered to be within the purview of the invention.

Figure 6:
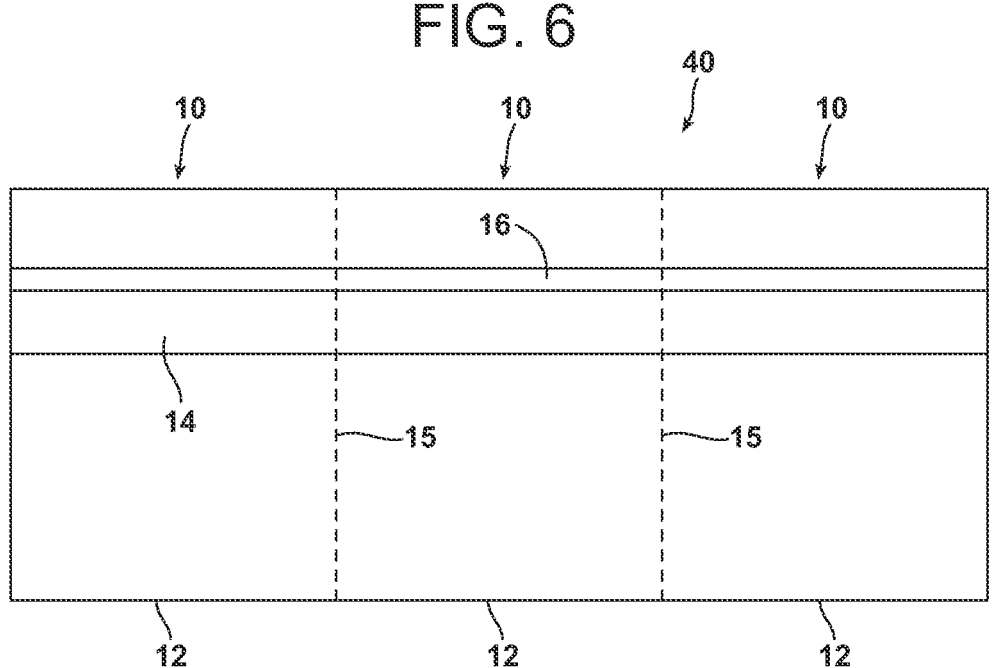
FIG. 6 is a schematic top plan view of a base shingle containing three separate hip and ridge shingles with perforations therebetween to facilitate separation of the hip and ridge shingles from the base shingle.

The shingle may be advantageously formed in-line using conventional roofing machines and existing roofing lines. Initially, a base layer 12 is formed of a size large enough to accommodate several individual hip and ridge shingles. Turning to FIG. 6, a base shingle 40 formed of a base layer 12 including three separate hip and ridge shingles 10 can be seen. To form a hip and ridge shingle 10, a first decorative layer 14 and a second decorative layer 16 may be affixed to the base layer 12 in-line with the inventive adhesive being placed at each interface of the layers 12, 14, and 16. Perforations 15 separating the three separate shingles 10 may then be punched or otherwise formed into the base layer 12. In some embodiments, the perforations 15 may be punched prior to the application of the first and second decorative layers. The perforations 15 permit a worker to easily detach one hip and ridge shingle 10 from another at the jobsite without the need for any additional equipment. Alternatively, the shingle 40 may not include perforations (not illustrated). If no perforations are present, the worker must cut or otherwise similarly detach the individual hip and ridge shingles 10 from the base shingle 40. The distance between the perforations and the resulting final size of the shingle 10 is dependent on the end use of the shingle 10, and may include considerations such as the location where the shingle 10 will be used. For example, some regions of the United States use a smaller hip and ridge shingle than other regions. Generally, the perforations are about 12 inches or less from each other, thus forming shingles with a width of approximately 12 inches (or less). The length of the shingle 10 may also be about 12 inches or less, and may or may not form a square shape.

Figure 7:
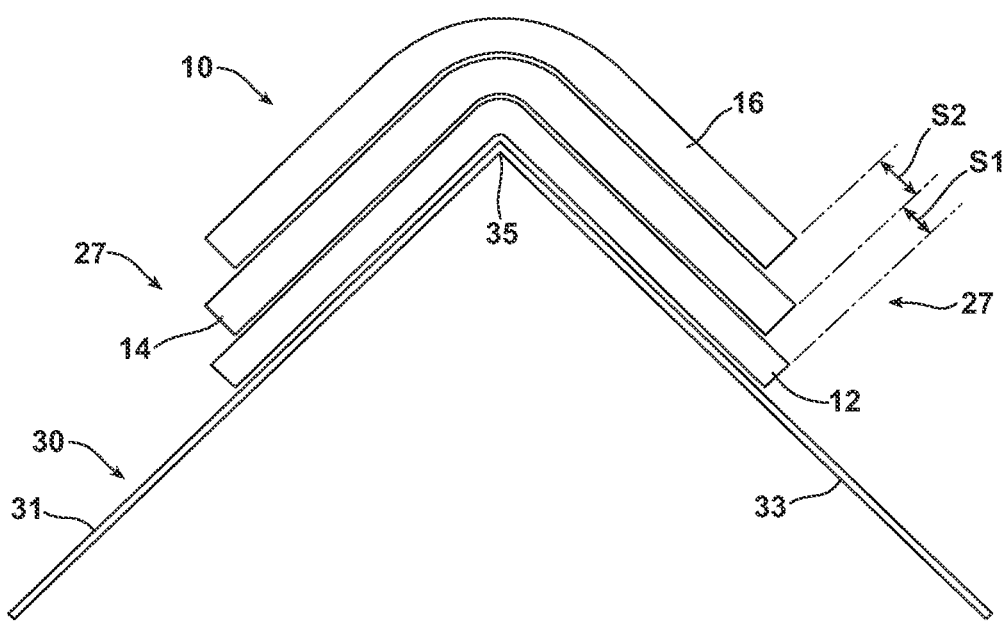
FIG. 7 is a schematic front elevational view of the hip and ridge shingle being bent to form a ridge or hip cover, the slippage of the individual layers being seen along the sides of the bent shingle.

FIG. 7 schematically illustrates the use of the hip and ridge single 10. Although the placement of shingles on the opposing planar portions 31, 33 of the roof 30 which are overlapped by the hip and ridge shingle 10 have not been shown, one skilled in the art will understand that before the hip and ridge shingle 10 is folded over the ridge 35 of the roof 30, the ridge 35 (which could also be a hip) being formed by the intersection of the two opposing planar surfaces 31, 33 of the roof 30, the shingles on the planar portions 31, 33 are affixed to the roof 30 up to the ridge 35. The base shingle 40 starts in a flat orientation, such as is depicted in FIG. 7, for the ease of shipping and because the ridges and hips are formed at variable angles. For instance, one building may have a roof slope of 6:12, while another may have a 4:12 slope, thus resulting in the need for a ridge cap that can be mated to the roof.

In use, the shingle 10 is detached from the base shingle 40 and is folded over the top of the ridge line 35 and secured in place, typically by nailing or otherwise mechanically affixing the hip and ridge shingle 10 to the roof. Subsequent shingle pieces 10 are then placed in an overlapping arrangement, similar to the orientation of the courses of conventional shingles (e.g. three-tab shingles) on the planar portions of the roof 30, beginning at one end of the ridge 35 and continuing to the opposing or distal end of the ridge 35. In particular, a first hip and ridge shingle may be mechanically affixed to the roof, such as by nailing through the first and second decorative layers and the base layer. A subsequent hip and ridge shingle is then placed over the first shingle such that the exposed portion of the second hip and ridge shingle is positioned over the decorative layers of the first hip and ridge shingle. This process is repeated with additional hip and ridge shingles until the end of the ridge line or hip is reached. The exposed portion of each subsequent shingle is thus raised, thereby providing a three dimensional, aesthetically pleasing appearance to the ridge line or hip.

It is to be appreciated that if the topmost decorative layer 16 were required to bend at the radius of curvature corresponding to the base layer 12 in a conventional shingle, the cap 10 would be likely to crack or break because of the thickness of the shingle 10 and because of the use of rigid adhesives. However, due to the flexibility of the inventive adhesive, the respective layers can move relative to the adjacent layer to accommodate the increasing radius of curvature, as is reflected in the offset edges 27 along the transverse sides of the cap 10. In the three-layer shingle 10 depicted in FIG. 7, the first decorative layer 14 is moved a distance of S1 relative to the base member 12 and the second decorative layer 16 is moved a distance S2 relative to the first decorative layer 14. The adhesive permits the relative movement and relaxes the stresses crated by folding the shingle 10 over the ridge. An incidental benefit of this movement between the layers 12, 14, 16 is that the offset edges 27 along the transverse sides of the cap 10 provide an additional three dimensional depth to the cap 10.

The adhesive composition of the present invention provides numerous advantages, such as, for example, flexibility at temperatures lower than or equal to about 40° F. In addition, it is envisioned that the hip and ridge shingle using the adhesive composition described herein can be manufactured in-line with conventional roofing machines on existing roofing lines. Incorporating the lamination of the decorative layers via the inventive adhesive in-line provides significant savings and an economic advantage. Further, the adhesive composition has little or no toxicity or safety issues, and, as a result, no additional safety precautions or equipment are needed to apply the adhesive to the layers forming the hip and ridge shingle.

The invention of this application has been described above both generically and with regard to specific embodiments. Therefore, it is to be understood that a wide variety of alternatives known to those of skill in the art can be selected within the generic disclosure. The invention is not otherwise limited, except for the recitation of the claims set forth below.

Having thus described the invention, what is claimed is:

1. A roof assembly comprising:
a first planar roof portion;
a second planar roof portion opposed to the first planar roof portion, wherein the first planar roof portion intersects the second opposed planar roof portion to form a ridge line or a hip of the roof assembly;
a hip and ridge shingle, comprising:
a base layer; and
a first decorative layer affixed to the base layer by a flexible adhesive, the flexible adhesive comprising a hydrocarbonaceous material, an oil, and at least one copolymer;
wherein each of the base layer and the first decorative layer are separate layers that are both bent over the ridge line or the hip such that the first decorative layer bends about a different radius of curvature than the base layer,
wherein the flexible adhesive allows movement of the first decorative layer relative to the base layer.

2. The roof assembly of claim 1 wherein the flexible adhesive has a viscosity that is less than or equal to about 1500 cps as measured by a Brookfield LVF Viscometer using spindle number 7 at 350° F.

3. The roof assembly of claim 1 wherein the at least one copolymer includes at least one a linear copolymer having an A-B di-block or an A-B-A tri-block structure, and a radial copolymer, the radial copolymer being selected from a block copolymer having an (AB)n radial structure where n is an integer of at least 4 and a block copolymer having a tri-block (A-B-A) radial structure having from 4-8 arms, and wherein the oil is present in an amount between about 2.0 to about 7.0 weight %.

4. The roof assembly of claim 3, wherein the radial copolymer is selected from styrene-butadiene-styrene (SBS) radial copolymers and styrene-isoprene radial copolymers, and wherein the copolymer forming the linear copolymer is selected from styrene-butadiene block copolymers and styrene-isoprene block copolymers.

5. The roof assembly of claim 3, wherein the ratio of radial copolymer to linear copolymer present in the adhesive ranges from 6:3 to 2:6.

6. The roof assembly of claim 1, wherein said oil is a paraffinic oil.

7. The roof assembly of claim 1, wherein the base layer has a first length and a first width and the first decorative layer has a second length and a second width, at least one of the second length and the second width being less than the corresponding first length and first width.

8. The roof assembly of claim 1 wherein the base layer includes a top side, a bottom side, a first reinforcement member coated with asphalt, and a first layer of granules applied to the asphalt coated first reinforcement member to form the top side of the base layer, and wherein the first decorative layer includes a top side, a bottom side, a second reinforcement member coated with asphalt, and a second layer of granules applied to the asphalt coated second reinforcement member to form the top side of the first decorative layer, wherein the bottom side of the first decorative layer is positioned onto the top side of the base layer and the flexible adhesive is applied between the bottom side of the first decorative layer and the top side of the base layer to affix the first decorative layer to the base layer.

9. The roof assembly of claim 8 wherein the asphalt coated onto the base layer and the asphalt coated onto the first decorative layer does not include the flexible adhesive.

10. The roof assembly of claim 8, wherein the hip and ridge shingle further comprises a second decorative layer having a top side, a bottom side, a third reinforcement member coated with asphalt, and a third layer of granules applied to the asphalt coated third reinforcement member to form the top side of the second decorative layer, wherein the bottom side of the second decorative layer is positioned onto the top side of the first decorative layer and the flexible adhesive is applied between the bottom side of the second decorative layer and the top side of the first layer to affix the second decorative layer to the first decorative layer.

11. The roof assembly of claim 10 wherein the second decorative layer is separate from the base layer and the first decorative layer, and the second decorative layer is bent over the ridge line or the hip of the roof assembly such that the second decorative layer bends about a different radius of curvature than the base layer or the first decorative layer.

* * * * *